United States Patent [19]

Kondo et al.

[11] Patent Number: 4,695,491

[45] Date of Patent: Sep. 22, 1987

[54] HEAT-SHRINKABLE COMPOSITE PACKAGING FILM

[75] Inventors: Kazuo Kondo; Nobuya Ishiguro; Teruo Tada, all of Marugame, Japan

[73] Assignee: Okura Industrial Co., Ltd, Marugame, Japan

[21] Appl. No.: 739,655

[22] Filed: May 31, 1985

[30] Foreign Application Priority Data

Jun. 6, 1984 [JP] Japan ................................ 59-117354

[51] Int. Cl.⁴ ........................ B65D 85/00; B32B 27/00
[52] U.S. Cl. .................................... 428/35; 428/216; 428/476.1; 428/516; 428/520; 428/518; 428/349; 428/215; 428/910; 426/129; 426/127; 264/176.1
[58] Field of Search ............... 428/215, 216, 516, 520, 428/35, 476.1, 910

[56] References Cited

U.S. PATENT DOCUMENTS

| | | | |
|---|---|---|---|
| 3,882,259 | 5/1975 | Nohara et al. | 428/516 |
| 4,409,364 | 10/1983 | Schmukler et al. | 525/74 |
| 4,416,944 | 11/1983 | Adur | 428/349 |
| 4,495,249 | 1/1985 | Ohya et al. | 428/516 |

*Primary Examiner*—P. C. Ives
*Attorney, Agent, or Firm*—Millen & White

[57] ABSTRACT

A heat-shrinkable, composite packaging film comprising (a) a core layer of saponified ethylene-vinyl acetate copolymer; (b) a first polymeric outer wall bonded to one side of the core layer; and (c) a second, heat-sealable polymeric outer wall bonded to the other side of the core layer; said first and second outer walls each having a permeability to hot water having a temperature of 90° C. of less than 600 g/m²/hour. The film is suitable for packaging meat and other food products subjected to sterilization and heat-shrinking process in a hot water bath.

9 Claims, No Drawings

HEAT-SHRINKABLE COMPOSITE PACKAGING FILM

BACKGROUND OF THE INVENTION

This invention relates to a heat-shrinkable composite packaging film having a core layer of saponified ethylene-vinyl acetate copolymer (hereinafter referred to as "EVOH") useful for packaging various meat products and the like.

It has long been the practice in the meat processing industry to enclose various meat products with a heat-shrinkable plastic film by vacuum packaging and then heating the resulting packs in hot water for sterilizing its contents while allowing the film to shrink by the heat. A variety of heat-shrinkable composite films having a layer of polyvinylidene chloride has been commercially available and widely used for this purpose. However, polyvinylidene based heat-shrinkable films have disadvantages in that they are often subjected to pinholes during packaging operations and transportation of packaged products resulting in contamination and spoilage of packaged contents. Polyvinylidene chloride based films have also been reported to generate carcinogenic dioxin upon combustion.

Heat-shrinkable two-ply films comprising a polyamide substrate layer and a heat-sealable plastic layer have also been used for the above-mentioned purpose, but their oxygen barrier properties are not high enough to ensure long term storage of various meat products packaged with these films.

Another type of heat-shrinkable composite films used for packaging meat products and the like comprises a core layer of EVOH sandwiched between a polyamide layer and a heat-sealable plastic layer. When these films are used to package meat or other products and soaked in hot water having a temperature above 90° C. for sterilizing and shrinking, whitening and delamination of packaging films may often be experienced thereby rendering the content invisible and degrading the value of the packaged products.

Therefore, there is a strong demand for a heat-shrinkable composite packaging film which exhibits high oxygen barrier properties so as to enable storage of meat products and the like for a long period of time and which remains transparent without whitening and delamination after the sterilization and shrinking operation in hot water.

BRIEF SUMMARY OF THE INVENTION

According to the present invention, there is provided a heat-shrinkable, composite packaging film comprising:
(a) a core layer of saponified ethylene-vinyl acetate copolymer (EVOH);
(b) a first polymeric outer wall bonded to one side of the core layer; and
(c) a second heat-sealable polymeric outer wall bonded to the other side of the core layer;
said first and second polymeric outer walls each having a permeability to hot water having a temperature of 90° C. of less than 600 g/m$^2$/hour.

In a preferred embodiment, the core layer is made of an EVOH having an ethylene content of 25–45 mole percent and a saponification degree of at least 96%.

Preferably the first polymeric outer wall is a laminate comprising an inner layer of a polymer having a low permeability to hot water, bonded to said one side of the core layer, and an outermost layer of an anti-blocking polymer bonded to said inner layer on a side thereof opposite to the core layer.

The second heat-sealable polymeric outer wall may also be a laminate of two polymeric layers with the heat-sealable polymeric layer facing outwardly.

DETAILED DESCRIPTION OF THE INVENTION

For use in packaging meat and other food products by enclosing them with a heat-shrinkable film, the film must withstand a standard sterilizing process and also refrigeration. It must also be heat-sealable and heat-shrinkable. Furthermore, it must have high oxygen barrier properties. It is for this reason that multilayer films are used for this purpose to comply with these essential requirements.

As hereinbefore stated, a three layer composite film having a core layer of EVOH having high oxygen barrier properties, a first outer layer of polyamide having high strength and anti-blocking properties, and a second outer layer of a heat-sealable polyolefin based polymer is known. However, this film is susceptible to whitening and delamination when packaged products are sterilized in hot water. Whitening and delamination could be prevented by heat treating the EVOH core layer. Experiments have shown, however, that the heat treatment greatly decrease the heat-shrinking properties of the film.

According to the present invention, the EVOH core layer is sandwiched between two outer walls each having a permeability to hot water having a temperature of 90° C. of less than 600 g/m$^2$/hour. By providing the core layer with these two outer walls, whitening and delamination thereof can be prevented without compromising other requisite properties. The permeability to hot water can be determined by sealingly enclosing a given amount of silica gel particles in a bag made of a given polymer having a given surface area. Then the bag is soaked in a water bath having a temperature of 90° C. and the permeability to hot water is determined based on the rate of incremental weight change for a period during which the rate of incremental weight change remains constant.

The EVOH core layer preferably has a thickness of at least about 3 microns to give satisfactory oxygen barrier properties. The upper limit depends on the total thickness of the composite films and is preferably less than 20 microns.

The EVOH from which the core layer is formed preferably has an ethylene content of 25–45 mole percent and a saponification degree of at least 96%. The EVOH core layer must, of course, be biaxially oriented to impart heat-shrinkability.

The first outer wall which will be exposed to the exterior after packaging is bonded to one side of the EVOH core layer. In a preferred embodiment of this invention, the first outer wall is a laminate of an inner layer of a polymer having low permeability to hot water directly bonded to said one side of core layer and an outermost layer of a polymer free of tackiness or blocking properties bonded to the inner layer. The anti-blocking properties are required for the outermost layer particularly when packaged products are sterilized in hot water in stacked configurations.

Examples of materials from which the outermost layer is made include polyamide resins such as nylon 6, nylon 66 and copolymers thereof. Examples of materials from which the inner layer is made include polyolefin based polymers such as polyethylene, polypropylene, ethylene-vinyl acetate copolymer and blends of these polymers. These polyolefin based polymers are preferably modified by graft polymerizing a polar comonomer such as polymerizable unsaturated carboxylic acids for improving heat-bonding properties to polyamide outermost layer and EVOH core layer. EVOH having a high ethylene content may also be used as the material of the inner layer. The inner and outermost layers each preferably has a thickness from about 5-25 microns.

The second outer wall which will come in contact with meat and other products after packaging is bonded to the core layer on a side of the core layer opposite to the first outer wall. The second outer wall may be a single layer or a laminate of two layers. Examples of materials from which the second outer wall is made include heat-sealable polyolefin based polymers such as polyethylene, ethylene-vinyl acetate copolymer and blends of these polymers. Again, these polyolefin based polymers are preferably modified by graft copolymerizing a polar comonomer, such as polymerizable unsaturated carboxylic acids, for improving heat-bonding properties to the EVOH core layer while retaining heat sealing and hot-water barrier characteristics. A single layer of these polyolefin based polymers having a thickness of about 5-50 microns is sufficient to exhibit the requisite permeability to hot water as defined. Alternatively the second outer wall may be a laminate having a corresponding total thickness of an inner layer of a modified polyolefin based polymer directly bonded to the core layer and an outermost layer of polyethylene, polypropylene, EVA or blends of these polymers.

The composite films of this invention preferably have a total thickness of about 20-120 microns, more preferably about 30-100 microns.

The composite films of this invention may be prepared by a number of techniques. Thus, for example, at least one layer is biaxially oriented and then other layers are successively dry laminated or extrusion coated on the oriented layer. Alternatively, one may coextrude all layers and the resulting coextrudate is then stretched and biaxially oriented. The latter technique is preferable. For example, polymers for forming respective layers of the film are coextruded through a multilayer die using a plurality of extruders into a flat or tubular extrudate. After cooling, the extrudate is re-heated to a temperature at which it is stretchable and then stretched in both longitudinal and transverse directions at least two times. Although tenter machines may be used for the stretching of flat extrudates, inflation or blowing of tubular extrudates is preferable. This is because the latter method permits easily the adjustment of the amounts of heat shrinkage in both directions to be substantially equal and the resulting tubular films may be folded into a configuration in which they are used for packaging purposes.

Since coextruded and stretched composite films thus prepared tend to be susceptible to spontaneous shrinkage upon leaving as such, the films are preferably post heat-treated so as to decrease the amount of spontaneous shrinkage without significantly compromising their heat shrinking characteristics. Thus the films should have a final heat shrinking amount of at least 15%, preferably at least 20% in hot water at 90° C. if they are used for packaging meat and other food products.

In a typically method for packaging meat and other food products with the films of this invention, the product to be packaged is placed in bags made of the film of this invention with the heat-sealable layers on the inside. The resulting packs are then evacuated, heat-sealed to close the mouth of bag, and then soaked in a water bath having a temperature above 90° C. for 10-20 minutes for sterilization and heat-shrinking purposes. This method gives a compact, wrinkle-free package having a good appearance. Since whitening and delamination of the packaging films are prevented during the sterilization and heat-shrinking operation in the hot water bath, the films of this invention permit storage of meat and other food products for a long period of time without deterioration due to atmospheric oxygen and humidity.

The following examples are provided for illustrative purposes only and are not for the purpose of limiting the invention of this application, which is defined in the claims below.

EXAMPLE 1

A biaxially oriented, heat-shrinkable film having a thickness of 15 microns and formed of a copolymer of nylon 6 and nylon 66 sold under the trade name AMILAN CM6041 by Toray Industries, Inc., a polyethylene film having a thickness of 20 microns, a biaxially oriented, heat-shrinkable film having a thickness of 10 microns made of EVOH sold under the trade name of SOARNOL ET by Nippon Synthetic Chemical Industry Co., Ltd., and the same polyethylene film as above were dry laminated in that order into a composite heat-shrinkable film having a total thickness of 65 microns.

Roast pork blocks were vacuum packed within bags made of the resulting film in a conventional manner as hereinbefore described. The packs were soaked in a hot water bath having a temperature of 95° C. for 15 minutes for sterilization and heat-shrinking purposes. Whitening and delamination of the film were not observed and the packed products were able to withstand storage for a long period of time.

The permeabilities to hot water as defined of the first outer wall consisting of the polyamide and polyethylene layers and of the second outer wall of polyethylene were found to be 32 g/m$^2$/hour and 81 g/m$^2$/hour, respectively.

EXAMPLE 2

The copolymer of nylon 6 and nylon 66 used in Example 1, a modified polyethylene resin sold under the trade name NOVATEC AP-220L by Mitsubishi Chemical Industries Limited, and the EVOH used in Example 1 were coextruded through a multilayer circular die using three extruders into a multilayer tubular extrudate consisting of, in the order from the exterior, polyamide, modified polyethylene, EVOH and modified polyethylene layers. The extruded tube was biaxially stretched by a conventional inflation technique to a thickness of each layer of 10 microns, 10 microns, 5 microns and 10 microns, respectively in said order.

A packaging test was carried out as in Example 1 using the resulting film and roast pork blocks. Whitening and delamination of the film were not observed and the packed products were able to withstand storage for a long period of time. Since the film of this example possessed a high heat-shrinking degree, the resulting packs were free from wrinkles, compact and exhibited a good appearance.

The permeabilities to hot water as defined of the first outer wall consisting of the polyamide and modified polyethylene layers and of the second outer wall of modified polyethylene were found to be 188 g/m²/hour and 158 g/m²/hour, respectively.

COMPARATIVE EXAMPLE 1

The copolymer of nylon 6 and nylon 66 used in Example 1, the EVOH used in Example 1, the modified polyethylene used in Example 2 and polyethylene were coextruded through a multilayer circular die using four extruders into a multilayer tubular extrudate consisting of, in the order from the exterior, polyamide, EVOH, modified polyethylene, and polyethylene. The extrudate was biaxially stretched as in Example 2 to a thickness of each layer of 10 microns, 5 microns, 5 microns and 20 microns, respectively in said order.

A packaging test was carried out as in Example 1 using the resulting film and roast pork blocks. The film was whitened in the EVOH core layer and delaminated at the interface thereof when the packed products were soaked in hot water having a temperature of 95° C. for 15 minutes or only for 5 minutes. The packed product was found to be susceptible to soilage upon storage within relatively short periods of time.

The first outer wall consisting of a single layer of polyamide exhibited a permeability to hot water as defined of as high as 894 g/m²/hour, whereas the second outer wall consisting of modified polyethylene and unmodified polyethylene exhibited a permeability to hot water as defined of 67 g/m²/hour.

COMPARATIVE EXAMPLE 2

The copolymer of nylon 6 and nylon 66 used in Example 1, a modified ethylene-vinylacetate copolymer sold under the trade name of NOVATEC AP-132E, sold by Mitsubishi Chemical Industries Limited, the EVOH used in Example 1 and polyethylene were coextruded and stretched as in Comparative Example 1 to obtain a tubular film consisting of, in the order from the exterior, a 5 microns thick polyamide layer, a 5 microns thick modified EVA layer, a 5 microns thick EVOH layer and a 20 microns thick polyethylene layer.

A packaging test was carried out as in Example 1. The EVOH core layer was whitened and delaminated in this test at a soaking time for 20 minutes at 95° C.

The first outer wall consisting of the polyamide and modified EVA layers exhibited a permeability to hot water as defined of 615 gm²/hour, whereas the second outer wall of polyethylene exhibited a permeability to hot water as defined of 63 g/m²/hour.

We claim:

1. A heat-shrinkable, composite packaging film comprising:
    (a) a core layer of saponified ethylene-vinyl acetate copolymer of 3-20 microns thickness;
    (b) a first polymeric outer wall, comprising a first inner layer of a modified polyolefin based resin, directly bonded to said one side of the core layer, and a first outermost layer of a polyamide resin bonded to said inner layer on the side thereof opposite to the core layer, said inner layer and said outermost layer each having a thickness of 5-25 microns; and
    (c) a second, heat-sealable polymeric outer wall, bonded to the other side of the core layer, comprising either (i) a single layer of a heat-sealable modified polyolefin based resin or (ii) a laminate comprising a second inner layer of a modified polyolefin based resin bonded to said other side of the core layer and a second outermost layer of a heat-sealable polyolefin based resin, the thickness of said second outer wall being 5-50 microns; said first and second outer wall each having a permeability to hot water having a temperature of 90° C. of less than 600 g/m²/hour;

said composite film having a total thickness of about 20-120 microns and exhibiting excellent resistance to whitening and delamination when a package sealed in an envelope of the composite film with said first outermost layer being exposed outwardly is sterilized in hot water.

2. The composite packaging film of claim 1, wherein the saponified ethylene-vinyl acetate copolymer has an ethylene content of 25-45 mole percent and a saponification degree of at least 96%.

3. The composite packaging film of claim 1, wherein said polyamide resin is a copolymer of nylon 6 and nylon 66.

4. The composite packaging film of claim 1, wherein the modified polyolefin based resin of said first inner layer is a modified polyethylene, modified polypropylene, modified ethylene-vinyl acetate copolymer or a blend thereof.

5. The composite packaging film of claim 1, wherein said single layer of heat-sealable modified polyolefin based resin of said second outer wall is a modified polyethylene, modified polypropylene, modified ethylene-vinyl acetate copolymer or a blend thereof.

6. The composite packaging film of claim 1, wherein said heat-sealable polyolefin based resin of said second outer wall is polyethylene, polypropylene, ethylene-vinyl acetate copolymer or a blend thereof.

7. The composite packaging film of claim 1, wherein said modified polyolefin based resin of said second inner layer is a modified polyethylene, modified polypropylene, modified ethylene-vinyl acetate copolymer or a blend thereof.

8. The composite packaging film of claim 1, as a tubular extrudate.

9. The composite packaging film of claim 8, as a biaxially stretched tubular extrudate of a tubular film of polyamide bonded to a tubular film of modified polyethylene, which is bonded to a tubular film of a saponified ethylene-vinyl acetate copolymer, which is bonded to a tubular film of a modified polyethylene.

* * * * *